(12) United States Patent
Liu

(10) Patent No.: US 6,501,726 B1
(45) Date of Patent: Dec. 31, 2002

(54) MAGNETIC COIL ACTUATOR

(75) Inventor: Chin-Sung Liu, Miao-Li (TW)

(73) Assignee: Acute Applied Technologies, Inc., Chutung (TW)

(*) Notice: Subject to any disclaimer, the term of this patent is extended or adjusted under 35 U.S.C. 154(b) by 0 days.

(21) Appl. No.: 09/354,200

(22) Filed: Jul. 14, 1999

(51) Int. Cl.$^7$ ............................................. G11B 21/16
(52) U.S. Cl. ..................................... 369/244; 360/265
(58) Field of Search .................... 369/244, 219, 369/249, 44.14, 44.21; 360/265, 266.9, 266.4, 264.7

(56) References Cited

U.S. PATENT DOCUMENTS

| | | | | |
|---|---|---|---|---|
| 4,506,307 A | * | 3/1985 | Watrous | 360/106 |
| 4,570,249 A | * | 2/1986 | Malissin et al. | 369/44.22 |
| 4,775,908 A | * | 10/1988 | Ycas | 360/106 |
| 4,835,643 A | * | 5/1989 | Schulze | 360/106 |
| 5,247,410 A | * | 9/1993 | Ebihara et al. | 360/264.9 |
| 5,351,221 A | * | 9/1994 | Ohno | 360/59 |
| 5,414,680 A | * | 5/1995 | Ikegame | 359/813 |
| 5,524,004 A | * | 6/1996 | Van Rosmalen | 359/814 |
| 5,579,295 A | * | 11/1996 | Van Rosmalen | 359/824 |

\* cited by examiner

*Primary Examiner*—David Hudspeth
*Assistant Examiner*—Angel Castro
(74) *Attorney, Agent, or Firm*—Birch, Stewart, Kolasch & Birch, LLP

(57) ABSTRACT

A magnetic coil actuator which can provide a higher output but maintains the original volume and the same power consumption is disclosed. The coil actuator uses a movable magnetic coil which is adjusted of its shape to meet the magnetic field of a static magnet. The coil is suitably bent to have its two diametric sections falling into the magnetic lines of the magnet, so as to maximize the usage rate of the coil to the magnetic field. Therefore, the coil actuator provides a higher output applicable to a tracking or focusing device of a pickup head, and meets the requirements of high speed optical recording devices.

8 Claims, 6 Drawing Sheets

MAGNETIC COIL ACTUATOR

FIELD OF THE INVENTION

The present invention relates to a magnetic coil actuator, and particularly relates a lens tracking or focusing driving coil appliance in a CD (compact disc) or DVD (digital versatile disc) driver.

DESCRIPTION OF THE RELATED ART

It is known in the art to use a magnetic coil actuator for driving a high precision device, such as a magnetic pickup head in a hard disc driver for tracking the disc tracks, or an optical pickup head in an optical disc driver for focusing the data pits. FIGS. 1A and 1B illustrate a coil driving device of the prior art. It includes mainly a magnet 10, a coil 11 and a yoke 12. The magnetic field of the permanent magnet 10 is illustrated as circular magnetic lines in FIG. 1B. Only a part of the coil 11 is disposed which is charged with to work with the magnetic field of the permanent magnet 10 when a controlling current is charged into the coil 11. However, since the remaining portion of the coil 11 is not disposed aligned with the magnetic field of the magnet 10, the utilitation efficiently of the magnet 10 to the coil 11 is rather low and wasteful.

It is especially true for today's high reading speed optical disc drivers that the need for accurate tracking and focusing operations requires higher outputs from the coil actuators. Otherwise the tracking or focusing cannot timely respond to the vibration of the disc.

This problem has been recognized by the inventors of the present invention that. The coil actuators of the prior art do not fully utilize the capacity of the coil and do not meet the requirements of high speed optical disc applications.

SUMMARY OF THE INVENTION

Accordingly, the primary object of the present invention is to improve the output of a magnetic coil actuator but not to increase the volume of the coil.

A second object of the present invention is to improve the coil actuator of a tracking dervomechanism used in an optical pickup head, and to meet the requirements of higher speed optical disc applications.

A further object of the present invention is to improve the coil actuator, of a focusing servo in an optical pickup head.

A coil actuator according to the present invention uses a flexible magnetic coil whose shape is adjusted to correspond to (i.e., be aligned with) the magnetic field of a static magnet. The coil is suitably bent to have its two diametric sections falling into the magnetic lines of a magnet, so as to maximize the utilization efficiency of the coil relative to the magnetic field. Therefore, the coil actuator maintains the original volume and the same power consumption, but provides a higher output.

BRIEF DESCRIPTION OF DRAWINGS

The above objectives and advantages of the present invention will become more apparent from the following detailed description of the present invention when taken in conjunction with the accompanying drawings, in which.

DETAILED DESCRIPTION OF PREFERRED EMBODIMENTS

Figure 1B:
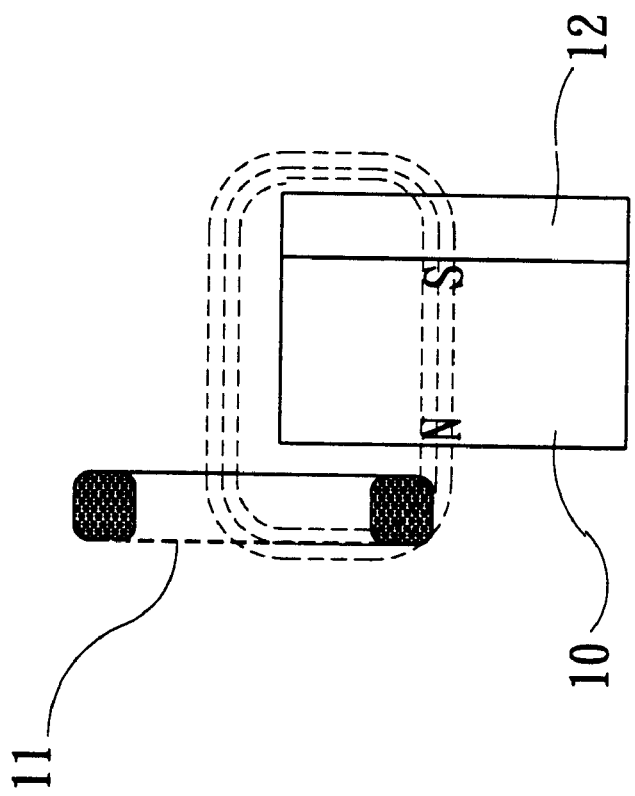
FIG. 1B is a sectional view taken from section I—I of FIG. 1A and showing the magnetic field.
Figure 1A:
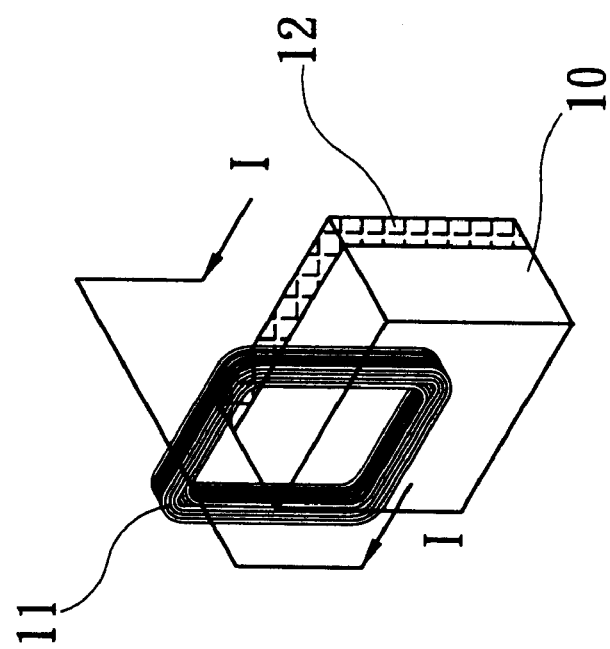
FIG. 1A is the perspective view showing a conventional coil actuator.
Figure 2B:
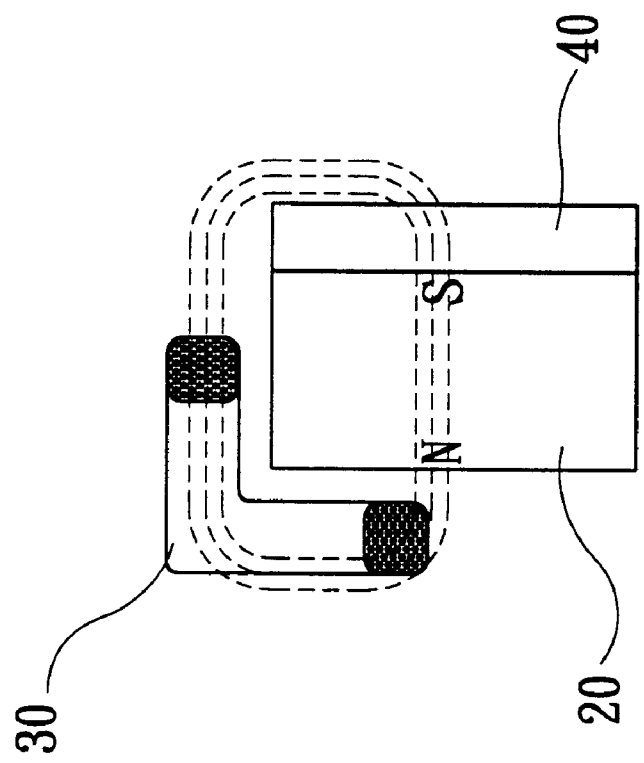
FIG. 2B is a sectional view taken from section II—II of FIG. 2A and showing the magnetic field.
Figure 2A:
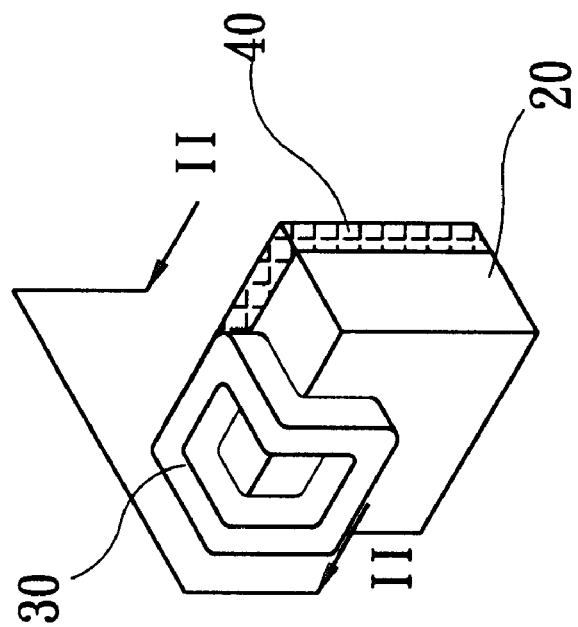
FIG. 2A is perspective view showing a first embodiment of the present invention.
Figure 4:
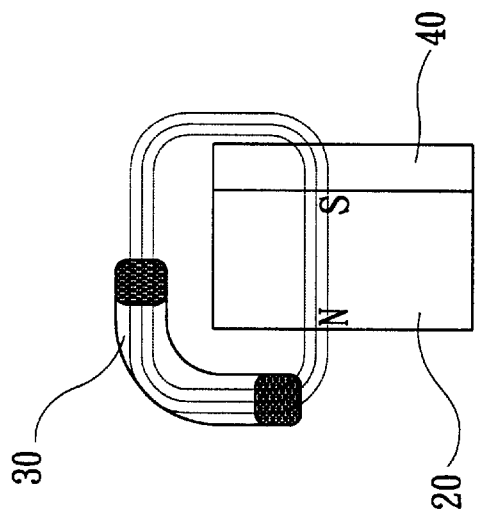
FIG. 4 is a sectional view of a second embodiment of the present invention.

Referring to FIGS. 2A and 2B, a coil actuator according to the present invention substantially includes at least a permanent magnet 20 and a movable coil 30. The magnet 20 is formed with a rectangular cross-section. Its magnetic lines are illustrated as shown. The coil 30 is of a rectangular shape and located at one side of the magnet 20 to keep a suitable gap between them. The gap is to free the coil 30 from the magnet 20 for controllable relative movements. One of the key elements of the present invention is to change the relative position of the coil 30 to the magnet 20. The coil 30 is bent with a suitable angle for exposing the cross sections of the coil into the magnetic lines of the magnet 20. The exemplary rectangular coil 30 can be bent into a right angle as shown in FIGS. 2A, 2B, or bent into a rounded angle as shown in FIG. 4, so as to allow the diametric sections of the coil 30 falling into the magnetic lines of the magnet 20. Furthermore, in order to enhance the magnetic field of the magnet 20, a yoke 40 can be incorporated with the magnet 20 on the side opposite to the coil 30.

Figure 3:
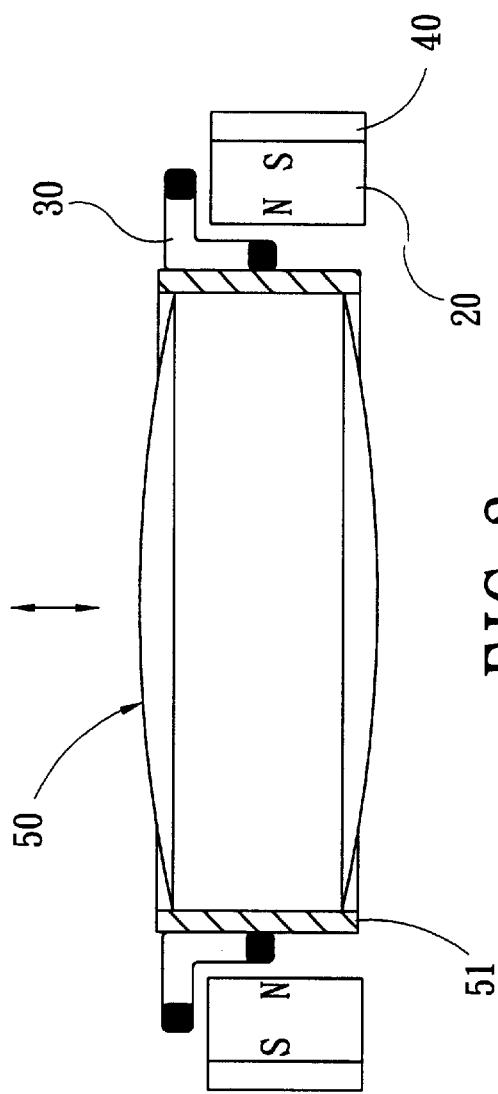
FIG. 3 is an exemplary application of the coil actuator of FIG. 2A for a focusing servo of an optical pickup head.

FIG. 3 is an exemplary application of the coil actuator of FIG. 2A for a focusing servo of an optical pickup head. At least two coils 30 are provided at diametric positions of an objective lens 50 which can move along with the lens 50 as a movable element, while the corresponding magnets 20 and yokes 40 are settled at fixed positions relative to the unshown pickup head as fixed elements. Therefore, during focusing control of the pickup head, the objective lens 50 will be linearly moved relative to the magnet 20 by the magnet force generated from variant current put into the coil 30, and achieve the focusing operation.

Figure 5:
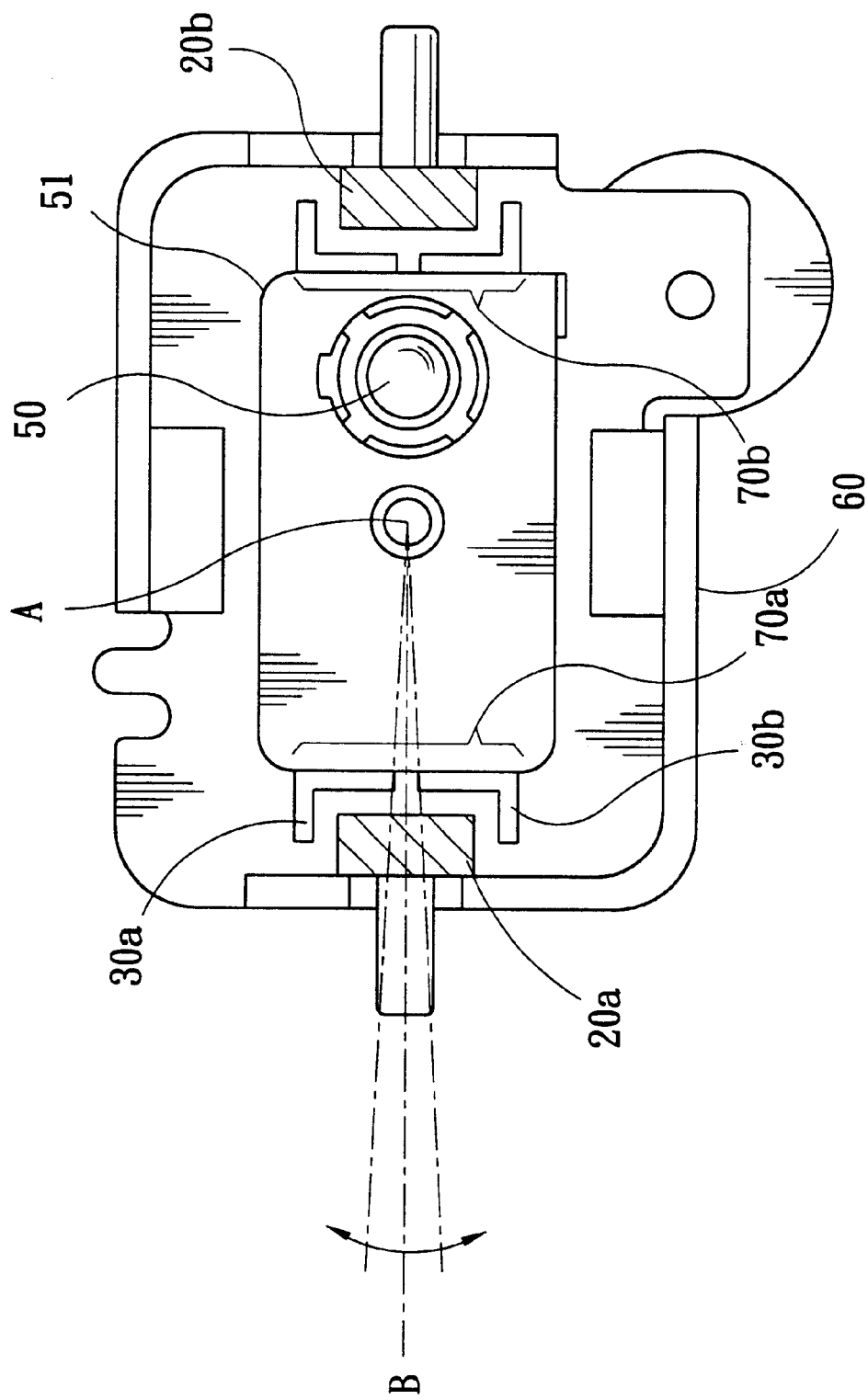
FIG. 5 is an exemplary application of the coil actuator of FIG. 2A for a tracking servo of an optical pickup head.

FIG. 5 is an exemplary application of the coil actuator of FIG. 2A for a tracking servo of an optical pickup head. The objective lens 50 is fixed on a lens holder 51 which is further pivoted, on a center point A to a case 60 for activating relative swinging movement. A first pair of coils 70b and a second pairs of coils 70a are oppositely fixed on the lens holder 51. On suitable positions on the case 60 corresponding to the pairs of coils 70b and 70a, two permanent magnets 20b and 20a are installed. Each pair of the coils 70b, 70a includes a first coil 30b and a second coil 30a symmetrically mounted on the lens holder 51 based on a radial line B. The pairs of coils 70b and 70a are driven by an unshown tracking control circuit to actuate the lens holder 51 and the lens 50 swinging relatively to the case 60 and achieve the tracking operation.

Figure 6:
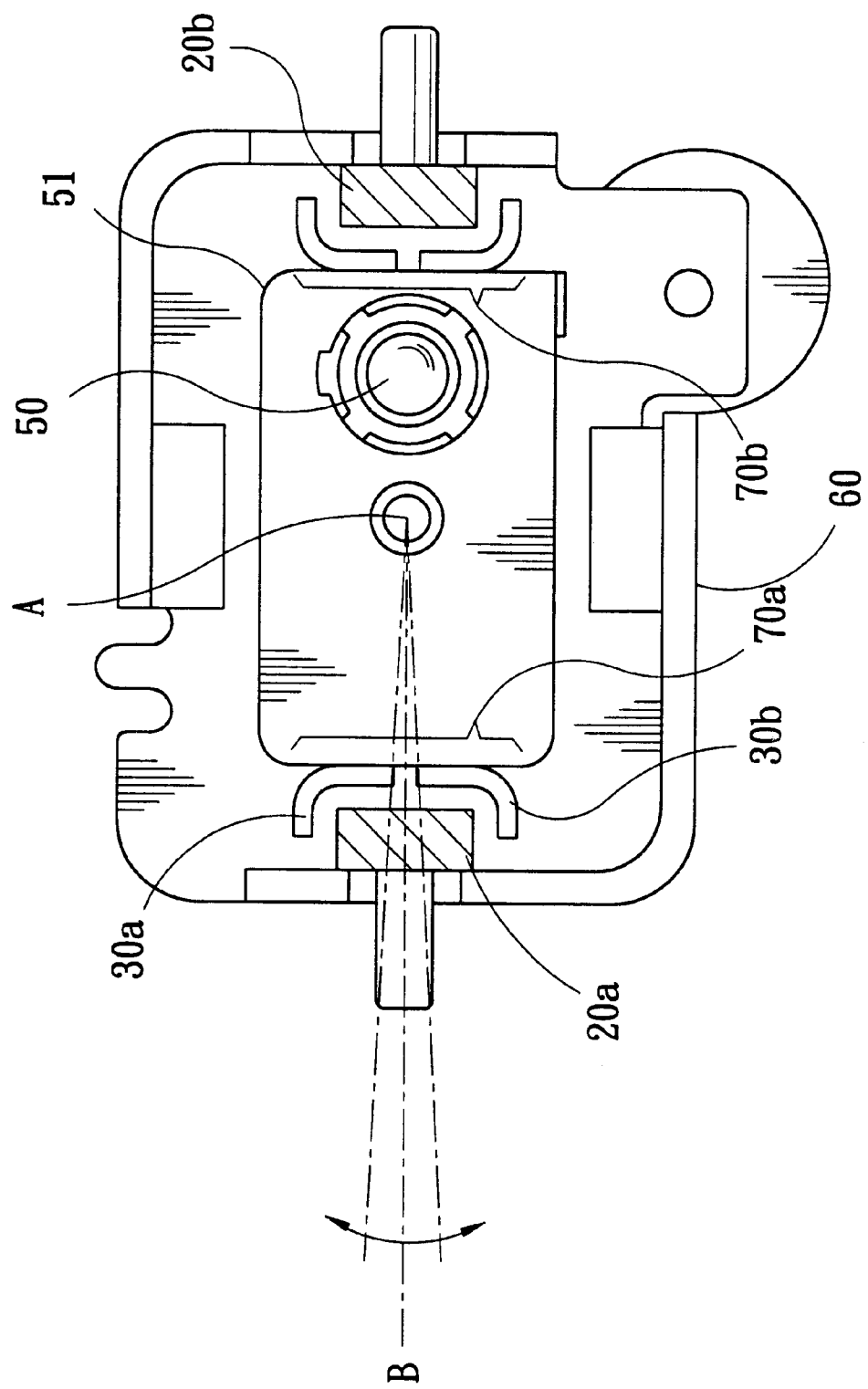
FIG. 6 is an exemplary application of the coil actuator of FIG. 4 for a tracking servo of an optical pickup head.

FIG. 6 shows another tracking servo of an optical pickup head utilizing the coil actuator of FIG. 4. The remaining mechanisms are the same as that of FIG. 5.

Figure 7:
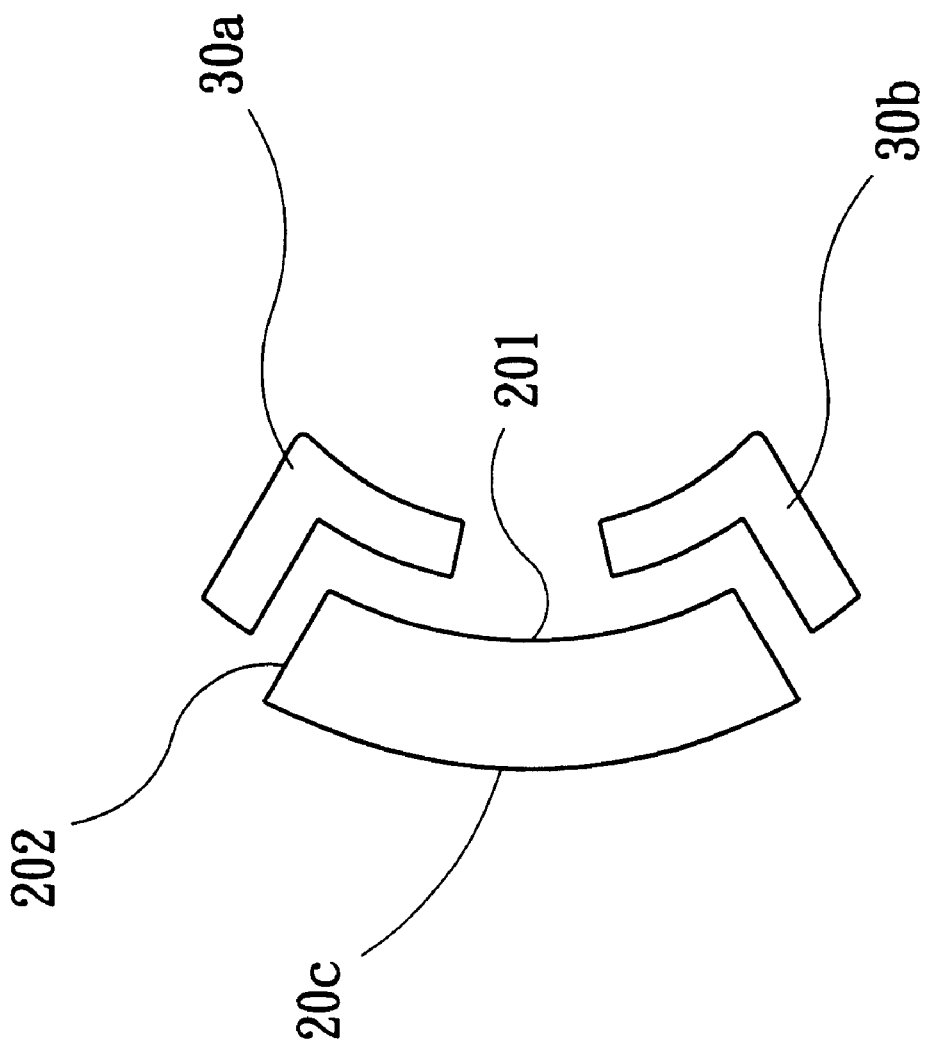
FIG. 7 is an explanatory diagram showing a third embodiment of the present invention.

Based on the spirit of this invention, the coil actuator can further be modified to any suitable shape. For example, as shown in FIG. 7, when using with a curvy magnet 20c, the coils 30a and 30b can be accommodated to change their shape into a curvy and bent one, i.e., half parts of the coils 30a and 30b reside along the arc 201 of the magnet 20c, and the other half parts reside along the cross side 202 of the magnet 20c, so as to acquire the optimum magnetic force.

In conclusion, the coil actuator according to the present invention improves the output of a magnetic coil but does not increase the volume of the coil nor increase the power consumption of the controlling current.

Although the invention has been described in connection with preferred embodiments, it will be understood by those skilled in the art that various changes may be made without departing from its scope.

What is claimed is:

1. A coil actuator for driving a movable element of a magnetic or optical disc drive, comprising:
   a permanent magnet having an associated set of magnetic lines; and
   at least one coil located at one side of said magnet, said at least one coil being fixed to a movable element and positioned near but spaced apart from said magnet, for generating a motion relative to said magnet, wherein said at least one coil is of a looped shape with an open central area, and said open central area is bent such that said at least one coil is aligned in substantially its entirety with said magnetic lines that are associated with two adjoining faces of said magnet, such that said magnetic lines that are associated with said two adjoining faces of said magnet pass through said bent open central area and assist in driving the movable element, wherein said magnet is of a sector shape, having two arcuate faces and two straight faces, and said at least one coil is bent such that one part of said at least one coil is parallel to one of said straight faces and another part of said at least one coil is parallel to one of said arcuate faces.

2. A coil actuator as recited in claim 1 wherein said at least one coil is of a rectangular shape, and two diametric sections thereof are positioned respectively at two adjacent faces of said magnet.

3. A coil actuator as recited in claim 2 wherein said at least one coil is bent into a right angle.

4. A coil actuator as recited in claim 2 wherein said at least one coil is bent into a rounded angle.

5. A coil actuator for driving a movable element of a magnetic or optical disc drive in a swinging motion, comprising:
   a permanent magnet having an associated set of magnetic lines; and
   two spaced apart coils, symmetrically fixed to a movable element and positioned near said magnet, for generating the swinging motion relative to said magnet, each coil being of a looped shape with an open central area, located at one side of said magnet while maintaining a gap therebetween, and each open central area of each coil being bent such that each said coil is aligned in substantially its entirety with said magnetic lines that are associated with two adjoining faces of said magnet, such that said magnetic lines that are associated with said two adjoining faces of said magnet pass through a respective bent open central area and assist in driving the movable element, wherein said magnet is of a sector shape, having two arcuate faces and two straight faces, and each coil is bent such that one part of each coil is parallel to one of said straight faces and another part of each coil is parallel to one of said arcuate faces.

6. A coil actuator as recited in claim 5 wherein each coil is of a rectangular shape, and two diametric sections thereof are positioned respectively at two adjacent faces of said magnet.

7. A coil actuator as recited in claim 6 wherein each coil is bent into a right angle.

8. A coil actuator as recited in claim 6 wherein each coil is bent into a rounded angle.

* * * * *